United States Patent [19]

Swift et al.

[11] 4,404,403

[45] Sep. 13, 1983

[54] PROCESS FOR PRODUCING ALIPHATIC AMINES

[75] Inventors: Harold E. Swift, Gibsonia; Robert A. Innes; Anatoli Onopchenko, both of Monroeville, all of Pa.

[73] Assignee: Millmaster Onyx Group, Inc., New York, N.Y.

[21] Appl. No.: 328,640

[22] Filed: Dec. 9, 1981

[51] Int. Cl.$^3$ .................. C07C 85/06; C07C 85/08
[52] U.S. Cl. ................................ 564/473; 564/480
[58] Field of Search ........................... 564/473, 480

[56] References Cited

U.S. PATENT DOCUMENTS

| | | | |
|---|---|---|---|
| 2,609,394 | 9/1952 | Davies et al. | 564/473 X |
| 2,636,902 | 4/1953 | Taylor et al. | 564/473 X |
| 2,848,495 | 8/1958 | Villemey | 564/473 X |
| 3,520,933 | 7/1970 | Adam et al. | 564/480 X |
| 3,832,402 | 8/1974 | Yeakey | 564/480 X |
| 3,976,697 | 8/1976 | Kuntschik et al. | 564/473 X |
| 4,036,883 | 7/1977 | Voges et al. | 564/480 |
| 4,078,003 | 3/1978 | Feichtinger et al. | 564/473 X |
| 4,210,605 | 7/1980 | Hoshino et al. | 564/473 |
| 4,254,060 | 3/1981 | Kimura et al. | 564/480 X |

*Primary Examiner*—Paul F. Shaver
*Attorney, Agent, or Firm*—Arthur A. Jacobs

[57] ABSTRACT

A process for producing aliphatic amines which comprises reacting an aliphatic alcohol or an aliphatic aldehyde with an aminating agent selected from the group consisting of ammonia, a primary amine and a secondary amine in the liquid phase in the presence of an unsupported catalyst consisting essentially of (1) copper oxide or copper hydroxide and (2) an organo nickel compound.

22 Claims, No Drawings

PROCESS FOR PRODUCING ALIPHATIC AMINES

BACKGROUND OF THE INVENTION

1. Field of the Invention

This invention relates to a process for producing aliphatic amines which comprises reacting an aliphatic alcohol or an aliphatic aldehyde with an aminating agent selected from the group consisting of ammonia, a primary amine and a secondary amine in the liquid phase in the presence of an unsupported catalyst consisting essentially of (1) copper oxide or copper hydroxide and (2) an organo nickel compound.

2. Description of the Prior Art

The liquid phase amination of long-chain alcohols and aldehydes with ammonia, primary amines or secondary amines is known. The use of copper or nickel catalysts for this reaction is known. Thus, copper has been used as cupric oxide on a refractory support or as a copper chromite catalyst. References such as U.S. Pat. No. 2,160,058 to Covert and French Pat. No. 780,028 disclose the use of copper oxide supported on alumina or silica gel. These references also disclose the use of copper barium chromite as catalysts for the amination reaction. More recently, copper barium chromite catalysts have been employed in U.S. Pat. No. 3,366,687 to Ellis et al and U.S. Pat. No. 4,138,437 to Strauss et al, while supported copper oxide catalysts have been used in German Application No. 2,709,864, U.S. Pat. No. 4,206,150 to Slaugh and U.S. Pat. No. 4,251,465 to Swift et al. Nickel is supplied in the form of Raney nickel in U.S. Pat. No. 2,953,601 to Whitaker, U.S. Pat. No. 3,152,185 to Zvienieka, and U.S. Pat. No. 3,223,734 to Fallstad et al. A nickel-copper-chromia catalyst has been used in U.S. Pat. No. 3,390,184 to Moss et al. In U.S. Pat. No. 4,152,353 Habermann discloses a process employing a catalyst comprising, on an oxide-free basis, 20 to 29 mol percent nickel, 36 to 79 mol percent copper and one to 15 mol percent of a third component selected from iron, zinc, zirconium and mixtures thereof.

Each of the catalysts in the above references exhibited relatively poor activity in the liquid phase amination processes described therein. By "liquid phase" we mean an amination process wherein the alcohol or the aldehyde is in the liquid phase and the ammonia or the primary or secondary amines are in the liquid or gaseous phase under the reaction conditions, defined hereinafter. Thus, large amounts of catalyst, high pressure and/or high temperature are required to achieve reasonable reaction rates. High temperatures and/or high pressures, however, tend to reduce the yield of desired product, while large amounts of catalysts involve higher costs, make filtration more difficult and give rise to additional problems associated with the disposal of spent catalyst. In each of U.S. Pat. Nos. 4,210,605 to Hishino et al and 4,254,060 to Kimura et al, there is described a homogeneous colloidal catalyst system based on compounds of copper, nickel and barium which are highly active. Although highly active, these catalysts have certain disadvantages. For example, they are highly sensitive to poisons in the feed, and the ligands used can form by-products which can contaminate the amine product. Since these systems are homogeneous, that is, they are colloidally dispersed in the reaction system, they can not be separated from the reaction product by filtration, but are recovered along with the heavy by-products when the desired amine product is distilled overhead. The number of useful catalyst cycles is therefore limited by the build-up of the associated heavies in the reactor. When the heavy fraction is finally recovered, it is contaminated with the catalyst in colloidal form.

SUMMARY OF THE INVENTION

We have found, unexpectedly, that an unsupported catalyst system consisting essentially of selected critical amounts of (1) copper oxide or copper hydroxide, and (2) an organo nickel compound is much more active in the liquid phase amination of aliphatic alcohols or aliphatic aldehydes with ammonia, a primary amine or a secondary amine than are the copper-chromium mixed oxides and supported copper oxides of the prior art. Since the major components of the catalyst system used herein are not colloidal, they can therefore easily be separated by filtration from the reaction product. The disadvantages associated with the catalyst systems of U.S. Pat. Nos. 4,210,605 and 4,254,060, referred to above, are significantly reduced.

The primary alcohol that is aminated herein can be defined by the following:

and the aldehyde by the following:

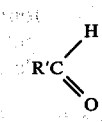

wherein R' is a linear or branched, saturated or unsaturated aliphatic group having from seven to 23 carbon atoms, preferably from seven to 17 carbon atoms.

The ammonia or primary or secondary amine that is reacted with above alcohol or aldehyde herein can be defined by the following:

wherein R" and R'", the same or different, can be hydrogen or a linear or branched, saturated or unsaturated aliphatic group having from one to 24 carbon atoms, preferably from one to 18 carbon atoms.

The amines that are formed herein can be defined by the following:

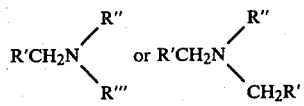

wherein R', R" and R'" are as defined above.

Examples of aliphatic alcohols that can be used herein include 1-octanol, 1-decanol, 1-dodecanol, 1-tetradecanol, 1-hexadecanol, 1-octadecanol, 2-ethyl-1-hexanol, oleyl alcohol, 1-nonanol and mixtures thereof. Examples of aliphatic aldehydes that can be used herein include: 1-octanal, 1-decanal, 1-dodecanal, 1-tetradecanal, 1-hexadecanal, 1-octadecanal, 2-ethylhexanal, oleyl aldehyde, 1-nonanal and mixtures thereof.

Primary amines that can be used herein include monomethylamine, monoethylamine, dodecylamine, hexadecylamine, 2-ethylhexylamine and mixtures thereof. Secondary amines that can be used herein include dimethylamine, diethylamine, dodecylmethylamine, dioctylamine and mixtures thereof.

Amines that can be prepared herein include dodecyldimethylamine, dodecylmonomethylamine, didodecylmethylamine, didodecylamine, 2-ethylhexyldimethylamine, oleyldimethylamine, tetradecyldimethylamine, hexadecyldimethylamine and octadecyldimethylamine.

For the reaction herein the alcohol and ammonia or primary or secondary amines can be used in varying amounts, although, in general, approximately stoichiometric amounts of each are used. In a preferred embodiment the ammonia or primary or secondary amines are used in slight excess.

The process defined herein is carried out in the contact presence of an unsupported catalyst consisting essentially of selected critical amounts of (1) copper oxide or copper hydroxide and (2) an organo nickel compound. By "copper oxide" and "copper hydroxide" we mean to include cuprous oxide alone, cuprous hydroxide alone, cupric oxide alone, cupric hydroxide alone or any combination thereof. By "an organo nickel compound" we mean to include soluble organo nickel salts, such as nickel carboxylates having from three to 30 carbon atoms, preferably from four to 20 carbon atoms, and inner organic complex salts of nickel having from two to 12 carbon atoms, preferably from four to eight carbon atoms. Examples of such salts include nickel propionate, nickel butyrate, nickel valerate, nickel caproate, nickel decanoate, nickel benzoate, nickel oleate, nickel stearate, etc., and nickel beta diketones, nickel beta ketoesters, nickel glyoximes, such as nickel acetylacetonate (2,4-pentanedionate), nickel 2,4-hexanedionate, nickel ethyl acetoacetate, nickel methyl acetoacetate, nickel dimethylglyoxime, etc.

The catalyst system used herein is either a physical mixture or composite of the compounds defined above wherein the nickel to copper atomic range is from about 0.0005:1 to about 0.2:1, preferably from about 0.001:1 to about 0.05:1.

The above catalyst system can be prepared most advantageously simply by physical admixture of the above components in the defined critical amounts. If desired, the catalyst system can be prepared by precipitating one or more of the components from solution. Thus, in a preferred method, the defined hydroxide can be co-precipitated from a water solution by dissolving a water-soluble salt of the metal, for example, copper nitrate, in water, adjusting the pH thereof with a suitable base, such as sodium hydroxide or potassium hydroxide, to a pH of about 7 to about 12, resulting in the precipitation of the corresponding metal hydroxide. After filtering, the recovered metal hydroxide can be washed with water to obtain a highly active catalyst mixture. If desired, for example, for ease of handling, the catalysts can be oven-dried at a temperature of about 80° to about 200° C. for about one to about 48 hours. Alternatively, the catalyst can be spray-dried at much higher temperatures. If desired the resulting product can be subjected to calcination temperatures of about 200° to about 500° C. for about one to about 24 hours. The organo nickel compounds are preferably added directly as such.

The process is simply effected by bringing together the reactants and the catalyst system defined above, while stirring, at a temperature of about 150° to about 300° C., preferably about 175° to about 250° C. while maintaining an absolute pressure of about one to about 100 atmospheres, preferably about one to about 10 atmospheres, most preferably about one to about two atmospheres. The total amount of catalyst needed is small, for example, in the range of about one to about five grams, preferably about 1.5 to about three grams, per 100 grams of alcohol or aldehyde charged. Amounts in excess of about five grams of catalyst can be used, if desired, to further increase reaction rates. Before using the catalyst herein, it is activated by reducing with hydrogen, preferably while it is dispersed within the reactant alcohol or aldehyde. This can be done, for example, by passing hydrogen therethrough while maintaining a temperature of about 100° to about 200° C. over a period of about 15 minutes to about one hour at atmospheric pressure.

In a preferred embodiment of the process defined and claimed herein, the liquid alcohol or liquid aldehyde is charged to a stirred reaction vessel along with the desired catalyst mixture, after which the reaction vessel is purged with an inert gas, such as nitrogen. Then as the reaction vessel is heated to reaction temperature, the catalyst is activated by bubbling hydrogen into and through the liquid phase. When the desired reaction temperature has been reached, for example, in the range of about 150° to about 300° C., and the catalyst has been activated, a gas stream containing hydrogen and the reactant amine is passed through the reaction mixture. The off-gases, comprising hydrogen, unreacted amine, water of reaction and traces of unreacted alcohol or aldehyde and traces of product amine, are continuously removed from the reaction zone. The off-gases are cooled to separate water, and an organic phase which is returned to the reactor. If desired, the off-gases can also be recycled to the reaction zone. This is continued until the conversion of alcohol or aldehyde is substantially complete. The product amine can be recovered from the reaction product by vacuum distillation. In a preferred embodiment, however, since the catalyst for the most part is heterogeneous the reaction product is subjected to filtration to remove catalyst therefrom. The resulting filtrate is then subjected to distillation to recover the desired product amine. The catalyst can be recycled and the bottoms, after distillation, will be substantially catalyst-free.

DESCRIPTION OF PREFERRED EMBODIMENTS

Examples I to IV

Several supported copper oxide catalysts and a copper chromite catalyst were evaluated for the production of dodecyldimethylamine from dimethylamine and 1-dodecanol using the following procedure:

A weighed amount of powdered catalyst and 100 grams of 1-dodecanol were charged to an indented round-bottom, 500-milliliter flask equipped with a heating mantle, a magnetic stirrer, a gas sparging tube, a water-cooled condenser and a Dean-Stark trap to remove water produced in the reaction and return the organic phase to the flask. In Example I silica gel was impregnated with an aqueous solution of $Cu(NO_3)_2.3H_2O$ and $KNO_3$. The resulting catalyst was oven-dried overnight at 120° C. and then calcined for one hour at 400° C. The catalyst of Example II was prepared as in Example I except that $Ni(NO_3)_2.6H_2O$ was also present during the impregnation step. In Example III, PCB carbon (an activated carbon sold by Pittsburgh Carbon Co., Pittsburgh, Pa.) was impregnated with an aqueous solution of $Cu(NO_3)_2 \cdot 3H_2O$, oven-dried overnight at 120° C. and then calcined for one hour at 400° C. The copper-chromite catalyst used in Example IV was purchased.

Nitrogen was then bubbled into the flask over a period of about 15 minutes while the contents thereof were being heated to 100° C. The nitrogen was then replaced by hydrogen flowing at a rate of 1345 millimols per hour over a period of 40 to 60 minutes while the contents of the flask were raised to 210° C. During this period the catalyst was activated. At 210° C. the hydrogen flow was reduced to 811 millimols per hour, and dimethylamine was passed through the contents of the flask at a flow rate of 1560 millimols per hour. The The results obtained are tabulated below in Table I. The quantities reported therein are defined as follows:

$$\text{Weight Percent Catalyst} = \frac{\text{Weight of Catalyst Charged}}{\text{Weight of Alcohol Charged}} \times 100$$

$$\text{Conversion} = \frac{\text{Mols of Alcohol Reacted}}{\text{Mols of Alcohol Charged}} \times 100$$

$$\text{Catalyst Activity} = \frac{10}{\text{Wt \% Catalyst} \times \text{Hours for 99\% conversion}}$$

$$\text{Wt \% Distillate} = \frac{\text{Wt of Product Recovered as Distillate}}{\text{Total Weight of Product}} \times 100$$

$$\text{Percent Yield} = \frac{\text{Wt \% Distillate} \times \text{Wt \% Alkyldimethylamine in the Distillate}}{100}$$

TABLE I

| Ex. No. | Catalyst | Wt % Catalyst | Hrs. for 99% Alcohol Conversion | Catalyst Activity | Wt % Distillate | Distillate Purity, Wt % RMe$_2$N* | Distillate Purity, Wt % RMeNH** | % Yield |
|---|---|---|---|---|---|---|---|---|
| I | 22% CuO + 1.2% K$_2$O on SiO$_2$ | 5.0 | 7.9 | 0.25 | 92.5 | 98.2 | 0.9 | 90.8 |
| II | 22% CuO + 1.2% K$_2$O + 1.2% NiO$_2$ on SiO$_2$ | 2.0 | 92% Conversion after 13 hours | | | | | |
| III | 22% CuO on Activated Carbon | 5.0 | 17% Conversion after 6 hours | | | | | |
| IV | 51% CuO + 47% Cr$_2$O$_3$ | 5.0 | 10.6 | 0.47 | 55.1 | 95.6 | 0.6 | 52.7 |

*Dodecyldimethylamine
**Dodecylmonomethylamine reaction was carried out at atmospheric pressure. Hourly samples of the reaction product were analyzed by gas liquid chromatography. When the alcohol conversion exceeded 99 percent or the run was otherwise terminated, the flask was purged with nitrogen and allowed to cool to ambient temperature. The final product was filtered to remove substantially all of the catalyst, and the filtrate was distilled to separate the dodecyldimethylamine fraction from heavy by-products, such as didodecylmethylamine. The distillate, consisting essentially of dodecyldimethylamine, was analyzed by gas liquid chromatography and titrated to confirm tertiary and secondary amine content.

From the above it can be seen that large amounts of supported copper oxides or copper chromite catalyst are required to achieve 99 percent conversion in under six hours. This should be contrasted with the examples below.

Examples V to XV

Each of Examples V to XV below was run following the procedure employed above in Examples I to IV, except that unsupported CuO alone or physical mixtures of CuO and an organo nickel compound were used. The data obtained are tabulated below in Table II.

TABLE II

| Ex. No. | Alcohol Feed | Grams of Catalyst Charged per 100 Grams of Alcohol CuO | Grams of Catalyst Charged per 100 Grams of Alcohol Nickel Salt | Atomic Ratio Ni/Cu | Hrs. for 99% Alcohol conversion | Catalyst Activity | Wt % Distillate | Distillate Purity, Wt % RMe$_2$N* | Distillate Purity, Wt % RMeNH** | % Yield | Remarks |
|---|---|---|---|---|---|---|---|---|---|---|---|
| V | 1-dodecanol | 2.0 | — | — | 7 | 0.7 | 87.0 | 95.7 | 0.2 | 83.3 | |
| VI | 1-dodecanol | 0.85 | — | — | — | — | — | — | — | — | 64% conversion in four hours |
| VII | 1-decanol | 0.50 | nickel stearate, 0.1 | 0.02 | — | — | — | — | — | — | 46.2% conversion in five hours |
| VIII | 1-dodecanol | 2.0 | nickel stearate, 0.4 | 0.03 | 3.5 | 1.2 | 86.7 | 97.0 | 0.2 | 84.0 | |
| IX | 1-dodecanol | 2.0 | nickel stearate, 0.1 | 0.01 | 3.0 | 1.6 | 91.2 | 98.7 | 0.1 | 90.0 | |
| X | 1-dodecanol | 2.0 | nickel stearate, 0.01 | 0.001 | 3.5 | 1.4 | 87.7 | 97.0 | 0.1 | 85.1 | |
| XI | 1-dodecanol | 2.0 | nickel acetylacetonate, 0.1 | 0.02 | 3.0 | 1.6 | 90.8 | 98.6 | 0.1 | 89.5 | |
| XII | 1-decanol | 0.5 | nickel stearate, | 0.02 | — | — | — | — | — | — | 51% conversion in seven hours |

TABLE II-continued

| Ex. No. | Alcohol Feed | Grams of Catalyst Charged per 100 Grams of Alcohol | | Atomic Ratio Ni/Cu | Hrs. for 99% Alcohol conversion | Catalyst Activity | Wt % Distillate | Distillate Purity, Wt % | | % Yield | Remarks |
|---|---|---|---|---|---|---|---|---|---|---|---|
| | | CuO | Nickel Salt | | | | | RMe$_2$N* | RMeNH** | | |
| XIII | 1-decanol | 0.5 | 0.1 nickel stearate, 0.39 | 0.1 | — | — | — | — | — | — | 60% conversion in seven hours |
| XIV | 1-decanol | 2.0 | nickel stearate, 0.4 | 0.03 | 3.0 | 1.4 | Not Distilled | 95.8*** | 0.2*** | Not Determined | |
| XV | 1-decanol | 2.0 | nickel stearate, 0.01 | 0.001 | 3.2 | 1.6 | Not Distilled | 94.9*** | 0.2*** | Not Determined | |

*Dodecyldimethylamine in Examples IX to XII; Decyldimethylamine in Examples XVI and XVII.
**Dodecylmonomethylamine in Examples IX to XIII; Decylmonomethylamine in Examples XVI and XVII
***Determined by gas liquid chromatography The advantage of operating in accordance with the procedure herein is obvious from the data in Table II. Note that in Examples Nos. V and VI, wherein solely CuO was used as catalyst, seven hours were required in Example No. V for 99 percent alcohol conversion, and at the end of four hours only 64 percent conversion was achieved in Example VI. However, when a small amount of a nickel salt was added to the catalyst systems in Examples Nos. VIII to XI, XIV and XV, catalyst activity was greatly increased, permitting lower reaction times, and distillate purity and yield were improved. That it is preferred to maintain at least about one gram of catalyst in the reaction zone per 100 grams of alcohol charged is apparent from each of Examples Nos. VII, XII and XIII, wherein poor results were obtained.

Obviously, many modifications and variations of the invention, as hereinabove set forth, can be made without departing from the spirit and scope thereof, and therefore only such limitations should be imposed as are indicated in the appended claims.

We claim:

1. A process for producing aliphatic amines which comprises reacting an aliphatic alcohol or an aliphatic aldehyde with an aminating agent selected from the group consisting of ammonia, a primary amine and a secondary amine in the liquid phase in the presence of an unsupported catalyst consisting essentially of (1) copper oxide or copper hydroxide and (2) an organo nickel compound, wherein the nickel to copper atomic range is from about 0.0005:1 to about 0.2:1.

2. The process of claim 1 wherein the nickel to copper atomic range is from about 0.001:1 to about 0.05:1 and the amount of catalyst is in the range of about one to about five grams per 100 grams of alcohol or aldehyde charged.

3. The process of claim 1 wherein said aminating agent is ammonia.

4. The process of claim 1 wherein said aminating agent is a primary amine.

5. The process of claim 1 wherein said aminating agent is a secondary amine.

6. The process of claim 5 wherein said aminating agent is dimethylamine.

7. The process of claim 1 wherein an aliphatic aldehyde is reacted with said aminating agent.

8. The process of claim 1 wherein an aliphatic alcohol is reacted with said aminating agent.

9. The process of claim 8 wherein said aliphatic alcohol is 1-dodecanol.

10. The process of claim 8 wherein said aliphatic alcohol is 1-decanol.

11. The process of claim 1 wherein 1-decanol is reacted with dimethylamine.

12. The process of claim 1 wherein 1-dodecanol is reacted with dimethylamine.

13. The process of claim 1 wherein said organo nickel compound is a nickel salt.

14. The process of claim 1 wherein said organo nickel compound is a nickel carboxylate.

15. The process of claim 1 wherein said organo nickel compound is an inner organic complex salt of nickel.

16. The process of claim 1 wherein said organo nickel compound is nickel stearate.

17. The process of claim 1 wherein said organo nickel compound is nickel acetylacetonate.

18. The process of claim 1 wherein the reaction temperature is in the range of about 150° to about 300° C. and the pressure is in the range of about one to about 100 atmospheres.

19. The process of claim 1 wherein the reaction temperature is in the range of about 175° to about 250° C. and the pressure is in the range of about one to about 10 atmospheres.

20. The process of claim 1 wherein the reaction temperature is in the range of about 175° to about 250° C. and the pressure is in the range of about one to about two atmospheres.

21. The process of claim 1 wherein the reaction product is filtered to remove solid catalyst therefrom and an alkyldimethylamine is recovered from the filtrate.

22. The process of claim 1 wherein water of reaction is continuously removed from the reaction zone.

* * * * *